United States Patent
Kim et al.

(10) Patent No.: US 11,624,425 B2
(45) Date of Patent: Apr. 11, 2023

(54) LAUNDRY TREATMENT APPARATUS

(71) Applicant: LG ELECTRONICS INC., Seoul (KR)

(72) Inventors: Dongcheol Kim, Seoul (KR); Youngjong Kim, Seoul (KR)

(73) Assignee: LG Electronics Inc., Seoul (KR)

(*) Notice: Subject to any disclaimer, the term of this patent is extended or adjusted under 35 U.S.C. 154(b) by 143 days.

(21) Appl. No.: 16/648,848

(22) PCT Filed: Sep. 19, 2018

(86) PCT No.: PCT/KR2018/011028
§ 371 (c)(1),
(2) Date: Mar. 19, 2020

(87) PCT Pub. No.: WO2019/059627
PCT Pub. Date: Mar. 28, 2019

(65) Prior Publication Data
US 2020/0263340 A1    Aug. 20, 2020

(30) Foreign Application Priority Data
Sep. 19, 2017  (KR) .................. 10-2017-0120632

(51) Int. Cl.
*D06F 23/04* (2006.01)
*F16H 3/60* (2006.01)
(Continued)

(52) U.S. Cl.
CPC .............. *F16H 3/60* (2013.01); *D06F 23/04* (2013.01); *D06F 37/30* (2013.01); *D06F 37/304* (2013.01);
(Continued)

(58) Field of Classification Search
None
See application file for complete search history.

(56) References Cited

U.S. PATENT DOCUMENTS

| 6,181,047 | B1* | 1/2001 | Nitta | D06F 37/304 |
| | | | | 310/179 |
| 2002/0166349 | A1* | 11/2002 | Lim | D06F 37/40 |
| | | | | 68/23.7 |
| 2005/0166643 | A1* | 8/2005 | Cho | D06F 39/083 |
| | | | | 68/12.02 |

FOREIGN PATENT DOCUMENTS

| CN | 1381634 A | 11/2002 |
| CN | 2558678 Y | 7/2003 |

(Continued)

*Primary Examiner* — Cristi J Tate-Sims
(74) *Attorney, Agent, or Firm* — Birch, Stewart, Kolasch & Birch, LLP

(57) ABSTRACT

A laundry treatment apparatus includes an outer tub to receive wash water, a driving motor having a stator fixed to the outer tub, and a rotor rotated relative to the stator, a washing shaft rotated together with the rotor, and a rotatable spin-drying shaft spaced apart from the rotor. The laundry treatment apparatus also includes an inner tub disposed in the outer tub, a pulsator provided in the inner tub at a lower portion thereof, and a clutch assembly. The inner tub is rotated together with the spin-drying shaft and the pulsator is rotated by the washing shaft. The clutch assembly selects one of a plurality of modes including i) at least one restriction mode of restricting the spin-drying shaft to the rotor or the outer tub and ii) a free mode of not restricting the spin-drying shaft to the rotor and the outer tub.

7 Claims, 12 Drawing Sheets

(51) Int. Cl.
*D06F 37/30* (2020.01)
*D06F 37/40* (2006.01)
*F16H 1/28* (2006.01)
*F16D 1/00* (2006.01)
*F16D 11/14* (2006.01)

(52) U.S. Cl.
CPC ............... *D06F 37/40* (2013.01); *F16H 1/28* (2013.01); *F16D 1/00* (2013.01); *F16D 11/14* (2013.01)

(56) References Cited

FOREIGN PATENT DOCUMENTS

| | | | |
|---|---|---|---|
| CN | 2651284 | Y | 10/2004 |
| CN | 1570252 | A | 1/2005 |
| CN | 1771363 | A | 5/2006 |
| CN | 1809661 | A | 7/2006 |
| CN | 2858713 | Y | 1/2007 |
| CN | 101446017 | A | 6/2009 |
| CN | 103628280 | A | 3/2014 |
| CN | 203866581 | U | 10/2014 |
| CN | 205099951 | U | 3/2016 |
| JP | 2000-279692 | A | 10/2000 |
| JP | 2008-517126 | A | 7/2006 |
| KR | 10-1999-0094883 | A | 12/1999 |
| KR | 10-2002-0094590 | A | 12/2002 |
| KR | 10-2004-0071407 | A | 8/2004 |

\* cited by examiner

LAUNDRY TREATMENT APPARATUS

TECHNICAL FIELD

The present disclosure relates to a laundry treatment apparatus capable of performing washing and spin drying.

BACKGROUND

In general, a top loading washing machine is a washing machine configured such that laundry is introduced into a washing tub from above and is removed therefrom. The most general type of the top loading washing machine is a pulsator type washing machine. The pulsator type washing machine washes laundry using a stream of wash water generated by forcibly moving wash water using mechanical force of a pulsator rotatably installed in a washing tub at the lower portion thereof, friction caused due to the stream of wash water, and emulsification of detergent in the state in which the detergent, the wash water, and the laundry are introduced into the washing tub.

A washing machine has an outer tub configured to receive wash water and an inner tub configured to receive laundry. In addition, the washing machine includes a pulsator configured to form various streams of water in a washing tub through forward rotation and reverse rotation. A driving motor is provided to rotate the pulsator and the inner tub. A laundry treatment apparatus configured to rotate only a pulsator in the state in which an inner tub is stationary or to rotate the inner tub and the pulsator together through a conventional clutch device is known.

SUMMARY

Technical Problem

In a conventional washing machine, rotational speed of a pulsator and rotational speed of an inner tub are fixedly determined depending on the mode of the washing machine and the rate of rotation of a driving motor, whereby delicate laundry may strongly collide with the pulsator or the inner tub and thus may be damaged. It is a first object of the present disclosure to solve this problem.

It is a second object of the present disclosure to provide a laundry treatment apparatus capable of variously corresponding to tastes of a user and conditions of laundry.

It is a third object of the present disclosure to improve detergent dissolution, laundry soaking, and washing functions by forming a composite stream of water using uniform power of a driving motor.

It is a fourth object of the present disclosure to provide a power transmission structure capable of adjusting the rate of rotation of a pulsator at a desired speed reduction ratio using uniform power of a driving motor and increasing torque of the pulsator accordingly.

Technical Solution

In accordance with the present disclosure, the above objects can be accomplished by the provision of a laundry treatment apparatus including an outer tub configured to receive wash water therein, a driving motor having a stator fixed to the outer tub and a rotor configured to be rotated relative to the stator, a washing shaft configured to be rotated together with the rotor, a spin-drying shaft disposed so as to be spaced apart from the rotor, the spin-drying shaft being configured to be rotatable, an inner tub disposed in the outer tub, the inner tub being configured to be rotated together with the spin-drying shaft, a pulsator provided in the inner tub at the lower portion thereof, the pulsator being configured to be rotated by rotation of the washing shaft, and a clutch assembly configured to select one of a plurality of modes including i) at least one restriction mode of restricting the spin-drying shaft to the rotor or the outer tub and ii) a free mode of not restricting the spin-drying shaft to the rotor and the outer tub.

In the free mode, rotation of the spin-drying shaft may be changeable by external load even in the state in which rotation of the rotor is uniform.

The at least one restriction mode may include a pulsator mode of restricting the spin-drying shaft to the outer tub and not restricting the spin-drying shaft to the rotor and a spin-drying mode of restricting the spin-drying shaft to the rotor and not restricting the spin-drying shaft to the outer tub.

The clutch assembly may include a coupler coupled to the spin-drying shaft so as to be rotated together therewith, the coupler being configured to be movable along the spin-drying shaft in the upward-downward direction, a coupler adjustment module configured to move the coupler in the upward-downward direction, a stopping member fixed to the outer tub, the stopping member being disposed at the upper side of the coupler, and a rotary member fixed to the rotor, the rotary member being disposed at the lower side of the coupler. The coupler may be restricted to the stopping member or the rotary member in the at least one restriction mode, and may not be restricted to the stopping member or the rotary member in the free mode.

The coupler may be configured to move to the upper limit position so as to be restricted to the stopping member, may be configured to move to the lower limit position so as to be restricted to the rotary member, and may be configured not to be restricted to the stopping member and the rotary member at a predetermined position between the upper limit position and the lower limit position.

The stopping member may include a stopping bushing portion having a plurality of recesses recessed upwards and spaced apart from each other in the circumferential direction. The rotary member may include a rotor bushing portion having a plurality of recesses recessed downwards and spaced apart from each other in the circumferential direction. The coupler may include a first coupling portion having a plurality of protrusions protruding upwards and engaged with the stopping bushing portion and a second coupling portion having a plurality of protrusions protruding downwards and engaged with the rotor bushing portion.

The distance between the upper end of the first coupling portion and the lower end of the second coupling portion may be less than the distance between the lower end of the stopping bushing portion and the upper end of the rotor bushing portion.

The at least one restriction mode may include a pulsator mode of restricting the coupler to the stopping member and not restricting the coupler to the rotary member and a spin-drying mode of restricting the coupler to the rotary member and not restricting the coupler to the stopping member.

The laundry treatment apparatus may further include a power transmission unit configured to transmit some of rotational force of the washing shaft to the inner tub in the free mode.

The power transmission unit may include a sun gear fixed to the washing shaft, the sun gear being configured to be rotated together with the washing shaft, a planetary gear engaged with the outer circumferential surface of the sun gear, the planetary gear being configured to be rotatable, a carrier to which a planetary-gear connection shaft coupled through a central portion of the planetary gear is fixed, and a ring gear engaged with the planetary gear such that the planetary gear is inscribed in the inside of the ring gear. One of the carrier and the ring gear may be rotated together with the pulsator, and the other may be rotated together with the inner tub.

The ring gear may be rotated together with the inner tub, and the carrier may be rotated together with the pulsator.

Advantageous Effects

In the free mode, the inner tub is free, whereby wear of delicate laundry may be prevented. Specifically, in the free mode, when the laundry is moved and collides with the inner surface of the inner tub by rotation of the pulsator, the inner tub is rotated to somewhat eliminate frictional force, whereby damage to the laundry may be reduced.

In addition, depending on conditions of laundry, it is possible to select the pulsator mode in which the laundry is washed using strong frictional force when necessary or the free mode in which rotational speed is changed such that frictional force is reduced depending on load when necessary.

The distance between the upper end of the first coupling portion and the lower end of the second coupling portion is less than the distance between the lower end of the stopping bushing portion and the upper end of the rotor bushing portion. In the state in which the first coupling portion is spaced apart from the stopping bushing portion, therefore, the second coupling portion may or may not be engaged with the rotor bushing portion. In the state in which the second coupling portion is spaced apart from the rotor bushing portion, therefore, the first coupling portion may or may not be engaged with the stopping bushing portion.

In the free mode, the pulsator is rotated and at the same time the inner tub is rotated in the opposite direction due to reaction force thereof through the power transmission unit, and when the laundry is moved and collides with the pulsator and the inner surface of the inner tub, rotation of the pulsator and the inner tub is changed to somewhat eliminate frictional force, whereby damage to the laundry may be reduced.

Also, in the free mode, the pulsator and the inner tub are rotated in opposite directions through the power transmission unit to stir wash water, whereby detergent dissolution and washing performance may be improved, and when laundry introduced from above the pulsator is biased due to rotation of the pulsator and thus vibration is generated, vibration generated by the pulsator may be reduced.

Also, in the pulsator mode, torque load of the driving motor may be reduced through the power transmission unit, and the motor is driven within a high efficiency range, whereby energy may be saved.

BRIEF DESCRIPTION OF THE DRAWINGS

FIGS. 4A and 4B show a restriction mode (a pulsator mode and a spin-drying mode), and FIG. 4C shows a free mode.

FIG. 5A shows a power transmission unit 140 according to a first embodiment, and FIG. 5B shows a power transmission unit 140 according to a second embodiment.

DETAILED DESCRIPTION

Figure 1A:
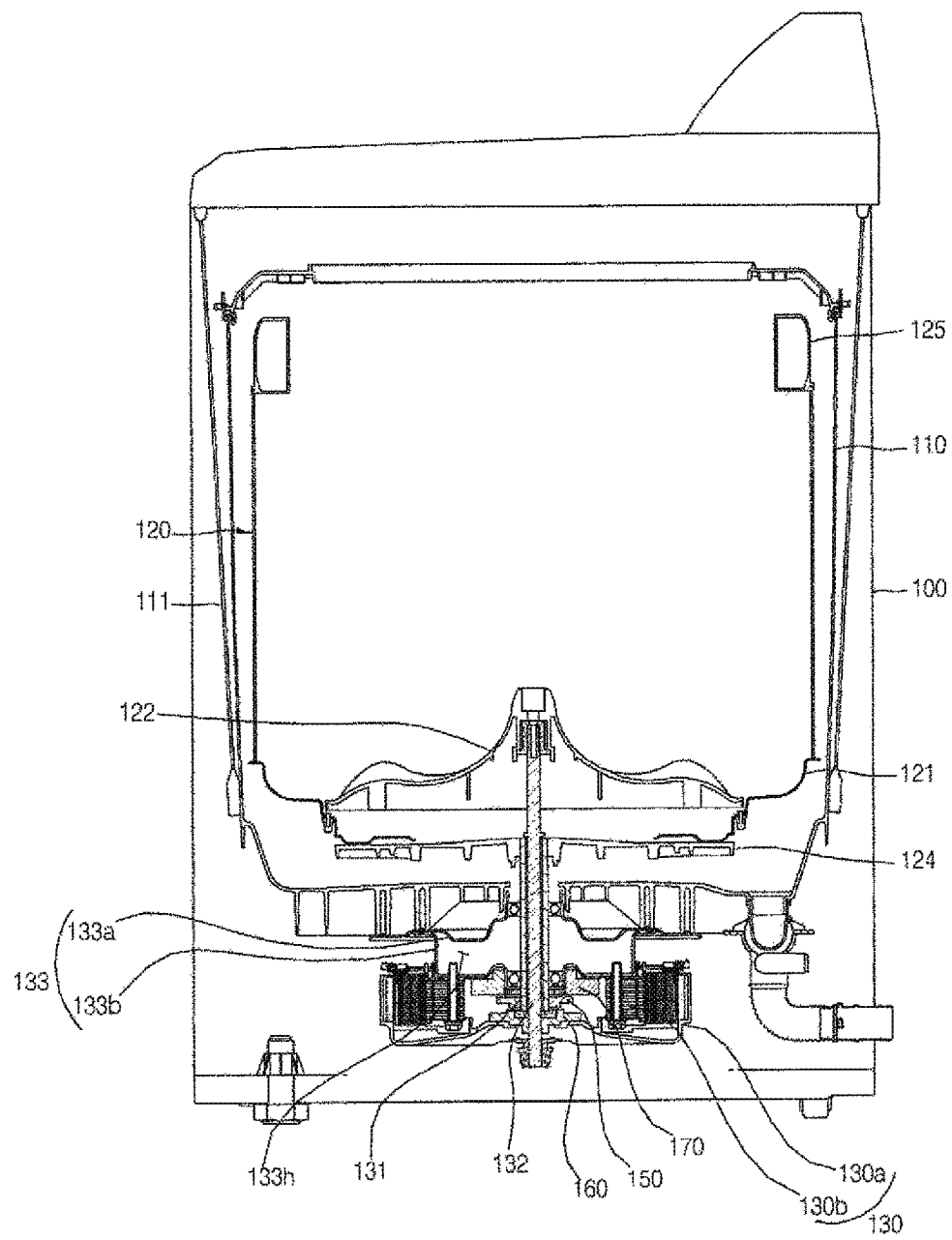
FIG. 1A is a sectional view of a laundry treatment apparatus according to embodiment A of the present disclosure when viewed from the side.

The expressions referring to directions, such as the "upper side" and the "lower side" mentioned hereinafter, are defined based on a top loading laundry treatment apparatus of FIG. 1; however, these definitions are given only for clear understanding of the present disclosure, and the directions may be differently defined depending on circumstances.

The "central axis" mentioned hereinafter means a straight line on which a rotary shaft of an inner tub 120 is disposed. The "centrifugal direction" mentioned hereinafter means a direction away from the central axis, and the "direction opposite to the centrifugal direction" means a direction toward the central axis. In addition, the "circumferential direction" means a direction about the central axis. The "outer circumferential portion" of a certain component means a "portion formed at the centrifugal portion in the circumferential direction" of the component.

When viewed from above to below, one of the clockwise direction and the counterclockwise direction is defined as a "first direction", and the other is defined as a "second direction."

In the following description, the terms "first," "second," "third," etc. are used only to avoid confusion between designated components, and do not indicate the sequence or importance of the components or the relationships between the components. For example, only a second component may be included without a first component.

That a first component is "fixed" to a second component, as mentioned hereinafter, includes the case in which the first component is coupled to a third component and the third component is coupled to the second component, whereby the position of the first component relative to the second component is maintained, as well as the case in which the first component is directly coupled to the second component.

That a first component and a second component are "rotated together," mentioned hereinafter, means that the first component is rotated at the same rotational speed as the second component in the same rotational direction as the second component, and includes the case in which the first component is coupled to a third component and the third component is coupled to the second component, whereby the first component and the second component are rotated together, as well as the case in which the first component is coupled to the second component, whereby the first component and the second component are rotated together.

That a first component is rotated independently of a second component, as mentioned hereinafter, means that the first component is not rotated together with the second component but is rotated separately from the second component, and includes the case in which the ratio of rotational speed of the second component to rotational speed of the first embodiment is preset so as to be uniform through gear engagement and the case in which the ratio of rotational speed is not uniform over time.

As used in this specification, the singular forms are intended to include the plural forms as well unless context clearly indicates otherwise.

Referring to FIGS. 1A to 1C and 7, a laundry treatment apparatus includes a cabinet 100, which defines the external appearance thereof. The laundry treatment apparatus includes an outer tub 110 disposed in the cabinet 100. The outer tub 110 receives wash water therein. The laundry treatment apparatus includes an inner tub 120 disposed in the outer tub 110. The inner tub 120 receives laundry therein. The inner tub 120 receives wash water therein. The laundry treatment apparatus includes a pulsator 122 rotatably disposed at the lower portion of the inner tub 120. The laundry treatment apparatus includes a driving motor 130 configured to generate rotational force of the pulsator 122 and the inner tub 120. The laundry treatment apparatus includes a clutch assembly 150, 160, 170, and 180 for switching between a plurality of modes.

The cabinet 100 may be configured to have a rectangular parallelepiped shape. The cabinet 100 includes a base cabinet, which defines the lower surface thereof, a side cabinet, which defines front, rear, left, and right surfaces thereof, and a top cover cabinet, which defines the upper surface thereof and has a laundry introduction hole, through which laundry is introduced into the laundry treatment apparatus.

A door 101, through which laundry is introduced and removed, is provided at the upper portion of the cabinet 100 (the top cover cabinet 100). The door 101 opens and closes the laundry introduction hole.

The outer tub 110 may be configured to have a cylindrical shape open at the upper side thereof. The outer tub 110 is supported in the cabinet 100 while being suspended by a suspension bar 111. The outer tub 110 stores wash water that is supplied thereto. The outer tub 110 is configured to dissolve and mix detergent that is supplied thereto in wash water. A drainage port is provided in the bottom of the outer tub 110.

The outer tub 110 includes a support member 133 fixed to the lower surface of the outer tub 110. The support member 133 supports the driving motor 130. A stator 130b of the driving motor 130 is fixed to the support member 133.

The support member 133 includes a first fixing part 133a fixed to the lower side of the outer tub 110. The first fixing part 133a may be generally formed of a circular plate. The first fixing part 133a is coupled to the lower side of the outer tub 110. The first fixing part 133a is disposed at the upper side of the driving motor 130. A spin-drying shaft 131 is disposed so as to extend through the center of the first fixing part 133a. In some embodiments, a washing shaft 132 or a pulsator connection shaft 146 is disposed so as to extend through the center of the first fixing part 133a.

The support member 133 includes a second fixing part 133b fixed to the lower side of the first fixing part 133a. The second fixing part 133b supports the driving motor 130. The stator 130b is fixed to a stator fixing portion 133b1 of the second fixing part 133b. The second fixing part 133b may be directly fixed to the lower surface of the outer tub 110. The second fixing part 133b is generally formed in a cylindrical shape having a central portion recessed from the upper side to the lower side thereof. The second fixing part 133b is disposed at the upper side of the driving motor 130. The washing shaft 132 is disposed so as to extend through the center of the second fixing part 133b. The spin-drying shaft 131 is disposed so as to extend through the center of the second fixing part 133b. The stopping member 170 may be fixed to the second fixing part 133b. A coupler adjustment module 180 may be fixed to the second fixing part 133b.

The support member 133 has an inner space 133h defined therein. In embodiment B of FIG. 1C, a gear module 142, 143, 144, and 145 is disposed in the inner space 133h.

The inner tub 120 is rotatably installed in the outer tub 110 in order to perform washing. The inner tub 120 is rotated by power from the driving motor 130. The inner tub 120 may selectively receive power from the driving motor 130 through intermittence of a clutch 137. The inner tub 120 may be configured to be stationary at the time of washing and rinsing and to be rotated at the time of spin drying.

The inner tub 120 is fixed to the spin-drying shaft 131. The inner tub 120 is configured to be rotated together with the spin-drying shaft 131. When the spin-drying shaft 131 is stopped, the inner tub 120 is also stopped. When the spin-drying shaft 131 is rotated, the inner tub 120 is also rotated.

The inner tub 120 includes a sidewall portion 120a, which defines the side surface thereof in the centrifugal direction. The sidewall portion 120a has a plurality of spin-drying holes. The wash water in the outer tub 110 is introduced inside the sidewall portion 120a through the plurality of spin-drying holes.

The inner tub 120 includes a balancer 125 mounted to the upper portion of the sidewall portion 120a. The balancer 125 may be formed so as to extend along the circumference of the sidewall portion 120a.

The inner tub 120 may include a base 121 coupled to the lower portion of the sidewall portion 120a. The base 121 is disposed at the lower side of the inner tub 120 to define at least a portion of the lower surface of the inner tub 120.

The base 121 defines the bottom of the inner tub 120. The upper portion of the base 121 is coupled to the lower end of the sidewall portion 120a.

The base 121 is generally formed so as to be recessed downwards. The base 121 is recessed downwards to define a space between the bottom of the base 121 and the lower surface of the pulsator 122.

The base 121 has a round portion 121a formed so as to be round downwards from the upper portion thereof. When the base 121 is viewed from above to below, the round portion 121a is disposed at the edge of the base 121. The round portion 121a is formed so as to extend in the circumferential direction. When the base 121 is viewed from above to below, the round portion 121a is formed while having an inclination such that the height thereof gradually decreases from the edge of the base 121 toward a central axis. The edge of the round portion 121a is connected to the lower end of the sidewall portion 120a.

A protrusion 121b is formed on the round portion 121a so as to protrude upwards. A plurality of semicircular protrusions 121b is disposed so as to be spaced apart from each other by a distance in the circumferential direction.

An opening is formed in the bottom of the base 121. The opening is formed in the center of the base 121. Water may be introduced from the lower portion outside the base 121 to inside the base 121 through the opening of the base 121.

The inner tub 120 includes a hub 124 coupled to the lower portion of the base 121. The hub 124 is disposed at the lower side of the inner tub 120. The hub 124 defines at least a portion of the lower surface of the inner tub 120. The hub 124 is formed of a circular member that has a greater thickness than the sidewall portion 120a and the base 121. The hub 124 transmits rotational force of the driving motor 130 to the base 121 and the sidewall portion 120a. The hub 124 may have a plurality of wash water introduction holes (not shown). The plurality of wash water introduction holes may be disposed so as to be spaced apart from each other in the circumferential direction. The wash water stored in the outer tub 110 may be introduced into the lower portion of the inner tub 120 through the wash water introduction holes of the hub 124.

The hub 124 is fixed to the spin-drying shaft 131. The hub 124 receives rotational force from the spin-drying shaft 131.

The hub 124 is fixed to the lower surface of the base 121. The hub 124 is disposed at the central portion of the base 121. A central coupling portion (not shown), which is coupled to the spin-drying shaft 131, is provided at the central portion of the hub 124. The central coupling portion has a hole formed therethrough in the upward-downward direction. The upper portion of the spin-drying shaft 131 is fixed to the central coupling portion. In some embodiments, the washing shaft 132 or the pulsator connection shaft 146 is disposed so as to extend through the hole of the central coupling portion 124b in the upward-downward direction.

The laundry treatment apparatus includes a pulsator 122 provided at the lower portion of the inner tub 120. The pulsator 122 is configured to be rotatable. The pulsator 122 is configured to be rotated by rotation of the washing shaft 132. The pulsator 122 is configured to be rotatable relative to the inner tub 120. The pulsator 122 receives power from the driving motor 130. In some embodiments, the pulsator 122 is fixed to the upper portion of the washing shaft 132 or the pulsator connection shaft 146. The pulsator 122 receives rotational force from the pulsator connection shaft 146. The pulsator 122 may be rotated in the forward direction and the reverse direction. In the case in which the pulsator 122 is used, the effect of washing laundry by rubbing is obtained.

The pulsator 122 includes a circular rotary plate 122a and a plurality of projections 122c formed on the top of the rotary plate 122 so as to protrude upwards. The pulsator 122 includes a central protrusion 122b formed on the central portion of the rotary plate 122a so as to protrude upwards.

The plurality of projections 122c is formed so as to extend from the central protrusion 122b in the centrifugal direction. One end of each projection 122c is connected to the central protrusion 122b, and the other end of each projection 122c extends toward the outer circumferential portion of the rotary plate 122a. The plurality of projections 122c is disposed so as to be spaced apart from each other in the circumferential direction. The upper surface of each projection 122c may be formed so as to be curved. The plurality of projections 122c may rotate introduced wash water in the forward direction and the reverse direction of the pulsator to form a stream of water.

An upper cap may be installed at the upper portion of the central protrusion 122b. The central protrusion 122b may be formed so as to protrude further than the plurality of projections 122c.

The pulsator 122 may have a plurality of through-holes (not shown). The plurality of through-holes is formed in the rotary plate 122a. The through-holes allow wash water to flow through the pulsator 122 in the upward-downward direction. Wash water may flow to the lower portion of the inner tub 120 through the through-holes.

A concave recess 122b1 may be formed in the central portion of the lower surface of the pulsator 122 so as to be concavely recessed upwards. A shaft support recess 122b2 may be formed in the concave recess 122b1 of the pulsator 122 so as to be concavely recessed upwards. The upper end of the pulsator connection shaft 146 is inserted into the shaft support recess 122b2. As a result, rotational force of the pulsator connection shaft 146 may be transmitted to the pulsator 122.

The laundry treatment apparatus includes a washing shaft 132 configured to be rotated by the driving motor 130. The laundry treatment apparatus includes a spin-drying shaft 131 disposed so as to wrap the circumference of the washing shaft 132. The washing shaft 132 may be disposed so as to extend through the spin-drying shaft 131.

The washing shaft 132 is located on the central axis. The washing shaft 132 is formed so as to extend in the upward-downward direction. The washing shaft 132 is rotated by the driving motor 130. The washing shaft 132 is fixed to a rotor 130a. The washing shaft 132 is rotated together with the rotor 130a. The washing shaft 132 is disposed so as to protrude toward the upper side of the rotor 130a.

The spin-drying shaft 131 is located on the central axis. The spin-drying shaft 131 is formed so as to extend in the upward-downward direction. The spin-drying shaft 131 is configured to be rotatable. The spin-drying shaft 131 is configured to determine whether to rotate the spin-drying shaft by the driving motor 130. The spin-drying shaft 131 is disposed so as to be spaced apart from the rotor 130a. The lower end of the spin-drying shaft 131 is disposed at the upper side of the rotor 130a so as to be spaced apart therefrom.

The spin-drying shaft 131 includes a coupler coupling portion 131a configured to allow the spin-drying shaft 131 to be rotated together with a coupler 150. The coupler coupling portion 131a is disposed at the outer circumferential portion of the spin-drying shaft 131. The coupler coupling portion 131a may define a plurality of protrusion lines extending in the upward-downward direction and disposed so as to be spaced apart from each other in the circumferential direction. A plurality of recesses configured to be engaged with the plurality of protrusion lines of the coupler coupling portion 131a may be formed in the inner circumferential surface of the coupler 150. The coupler 150 is coupled to the coupler coupling portion 131a, whereby the coupler 150 and the spin-drying shaft 131 are rotated together, and the coupler 150 is configured to be movable relative to the spin-drying shaft 131 in the upward-downward direction.

The laundry treatment apparatus includes a driving motor 130 disposed at the lower side of the outside of the outer tub 110. The driving motor 130 may include a stator 130b and a rotor 130a. The driving motor 130 includes a stator 130b fixed to the outer tub 110 and a rotor 130a configured to be rotated relative to the stator.

The stator 130b is fixed to the outer tub 110 via the support member 133. The stator 130b is disposed in the rotor 130a in a direction opposite to the centrifugal direction. The rotor 130a is rotated by electromagnetic interaction with the stator 130b. The washing shaft 132 may be fixed to the rotor 130a so as to be rotatable with the rotor 130a.

The driving motor 130 is supported by the outer tub 110. The driving motor 130 is supported by the support member 133 of the outer tub 110. The stator 130b is fixed to and supported by the support member 133. The rotor 103*a* is fixed to and supported by the washing shaft 132, which is rotatably supported by the support member 133.

Referring to FIGS. 1A to 4C, the clutch assembly 150, 160, 170, and 180 is configured to select one of a plurality of modes. The plurality of modes includes i) at least one restriction mode of restricting the spin-drying shaft 131 to the rotor 130*a* or the outer tub 110 and ii) a free mode of not restricting the spin-drying shaft 131 to the rotor 130*a* and the outer tub 110. In the free mode, the spin-drying shaft 131 is free from the rotor 130*a* and the outer tub 110.

The at least one restriction mode may include a pulsator mode of restricting the spin-drying shaft 131 to the outer tub 110 and not restricting the spin-drying shaft 131 to the rotor 130*a* and a spin-drying mode of restricting the spin-drying shaft 131 to the rotor 130*a* and not restricting the spin-drying shaft 131 to the outer tub 110.

The clutch assembly 150, 160, 170, and 180 includes a coupler 150 coupled to the spin-drying shaft 131 so as to be rotated together therewith. The coupler 150 is configured to be movable along the spin-drying shaft 131 in the upward-downward direction.

The clutch assembly 150, 160, 170, and 180 includes a coupler adjustment module 180 configured to move the coupler 150. The coupler adjustment module 180 moves the coupler 150 in the upward-downward direction.

The clutch assembly 150, 160, 170, and 180 includes a stopping member 170 configured to restrict the coupler 150 to the outer tub 110. The stopping member 170 is disposed at the upper side of the coupler 150. The stopping member 170 is fixed to the outer tub 110.

The clutch assembly 150, 160, 170, and 180 includes a rotary member 160 configured to restrict the coupler 150 to the rotor 130*a*. The rotary member 160 is disposed at the lower side of the coupler 150. The rotary member 160 is fixed to the rotor 130*a*.

A laundry treatment apparatus according to embodiment A will be described with reference to FIG. 1A. The laundry treatment apparatus according to embodiment A does not have a power transmission unit, a description of which will follow. The pulsator 122 is fixed to the washing shaft 132. The pulsator 122 is rotated together with the washing shaft 132. The lower end of the washing shaft 132 is fixed to the rotor 130*a*, and the upper end thereof is fixed to the pulsator 122.

In embodiment A, whether to rotate the spin-drying shaft 131 may be determined by the clutch assembly 150, 160, 170, and 180. In the pulsator mode, the spin-drying shaft 131 is restricted to the outer tub 110, whereby the spin-drying shaft is not rotated, and the spin-drying shaft remains stationary even when rotational load, such as laundry load, is applied thereto from outside. In the spin-drying mode, the spin-drying shaft 131 is restricted to the rotor 130*a*, whereby the rotor 130*a* and the washing shaft 132 are rotated together, and the pulsator 122 and the inner tub 120 are rotated together. In the free mode, the spin-drying shaft 131 is free from the outer tub 110 and the rotor 130*a*, whereby the inner tub 120 is stationary in a non-load state in which there is no laundry or water. When rotational load of laundry is applied to the inner tub 120 in the free mode, the inner tub 120 may be freely rotated. That is, in the free mode, the inner tub 120 is in the state in which the inner tub is rotatable due to external force even though rotational force of the rotor 130*a* is not transmitted thereto. When laundry moves and collides with the inner surface of the inner tub 120 by rotation of the pulsator 122 in the free mode, the inner tub 120 may be rotated to somewhat reduce frictional force, whereby the effect of reducing damage to the laundry may be achieved.

Figure 1B:
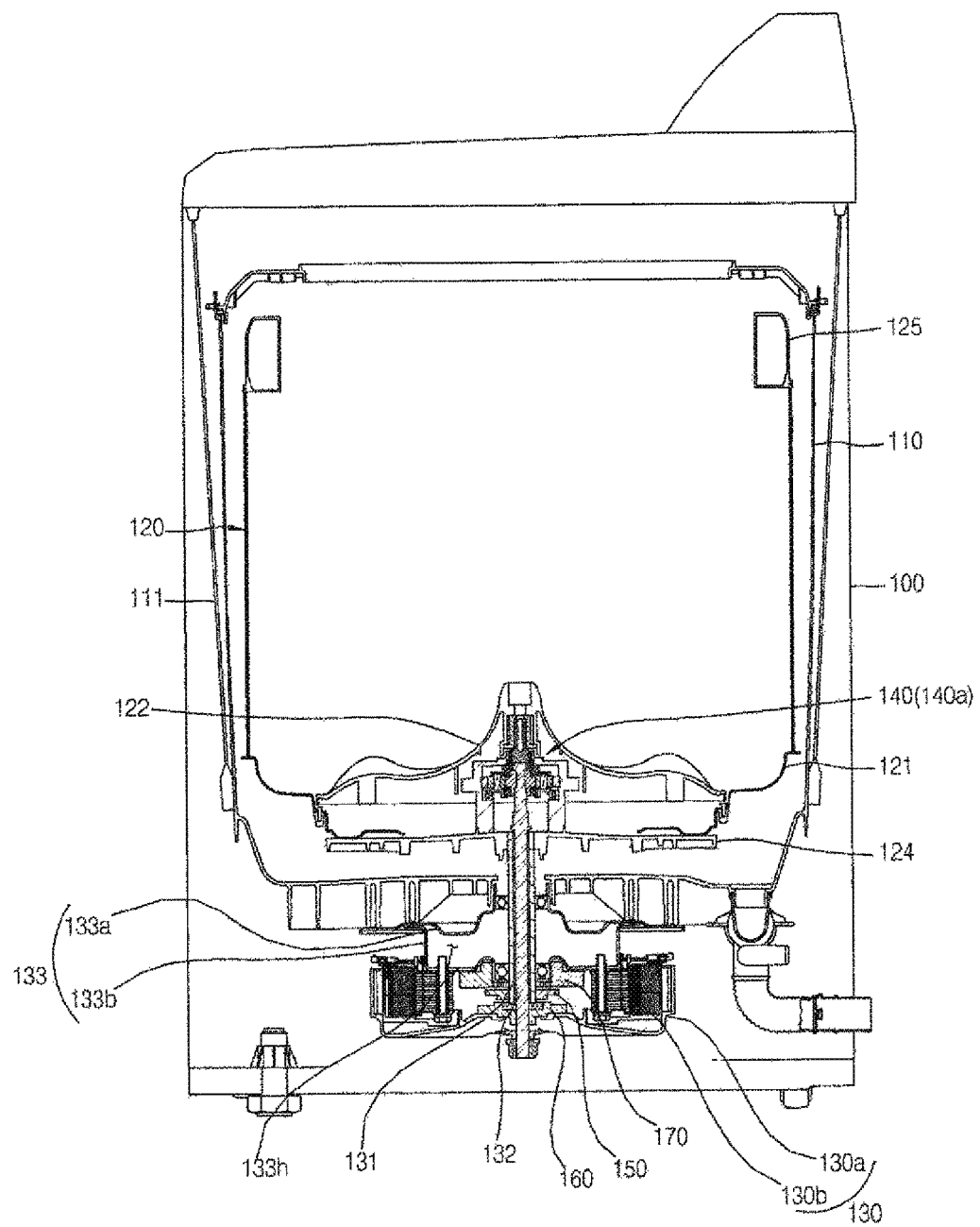
FIG. 1B is a sectional view of a laundry treatment apparatus according to embodiment B of the present disclosure when viewed from the side.
Figure 1C:
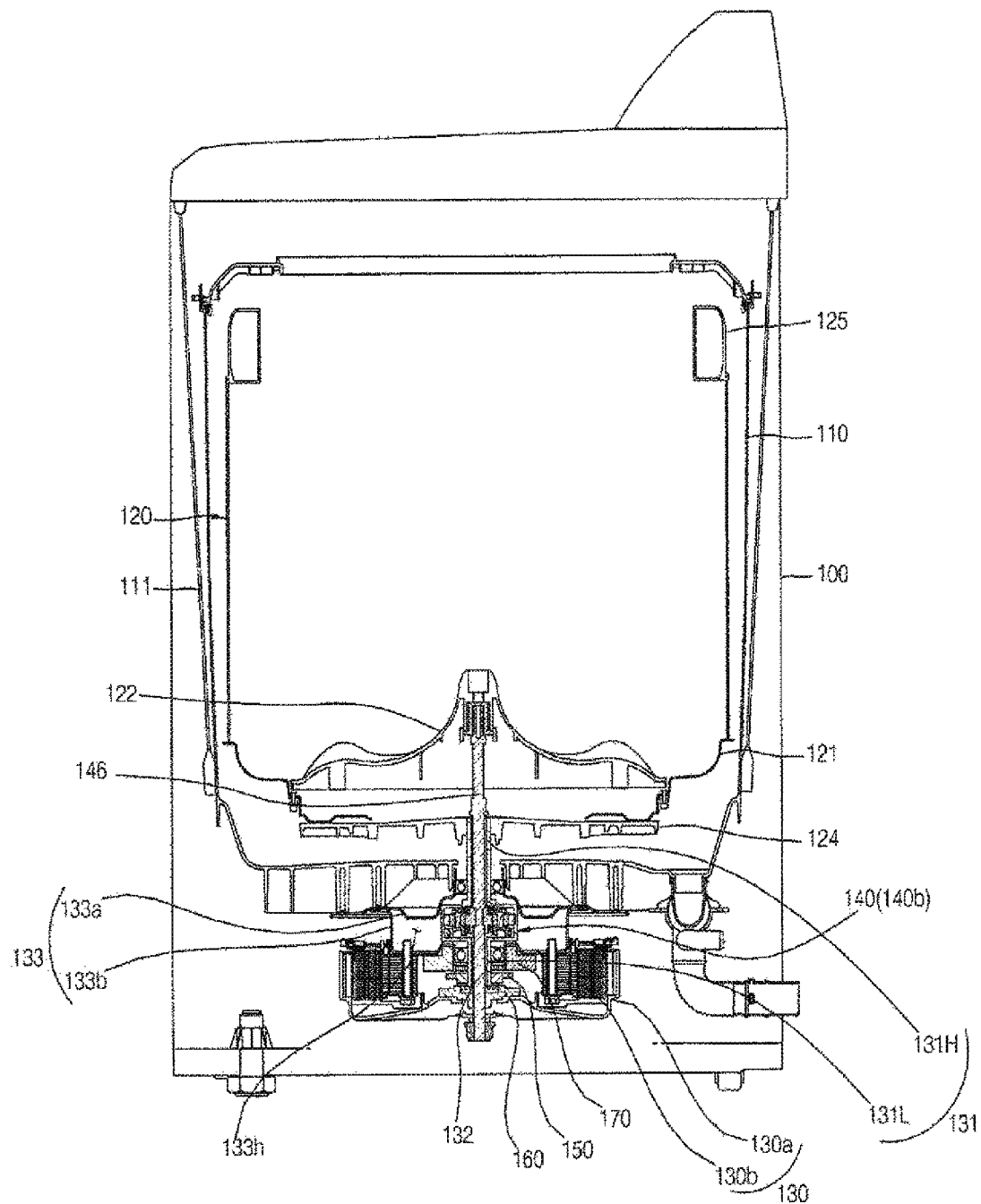
FIG. 1C is a sectional view of a laundry treatment apparatus according to embodiment C of the present disclosure when viewed from the side.
Figure 2:
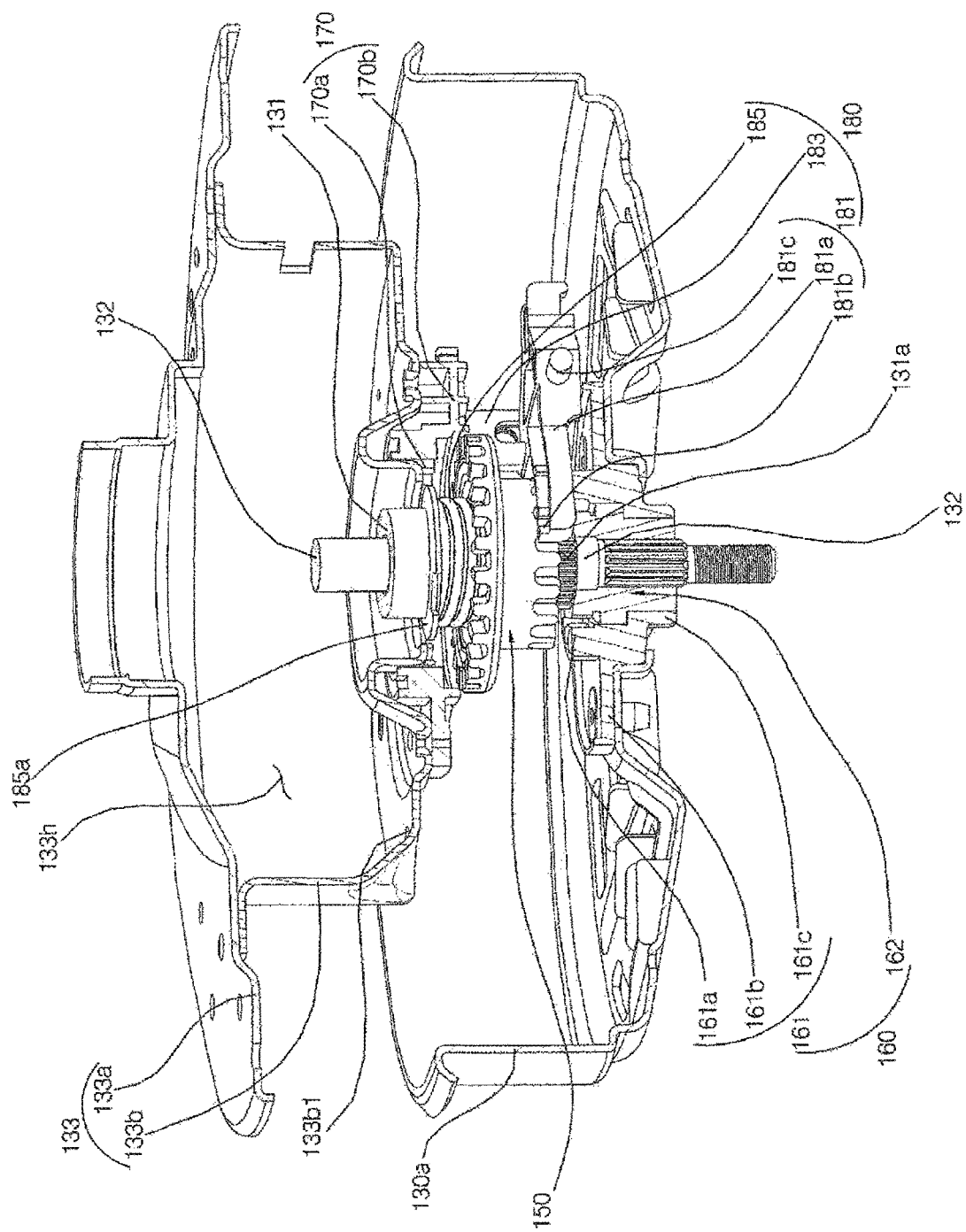
FIG. 2 is a partial cutaway perspective view showing a coupler 150, a rotary member 160, and a stopping member 170 of each of FIGS. 1A to 1C and components thereabout.
Figure 3:
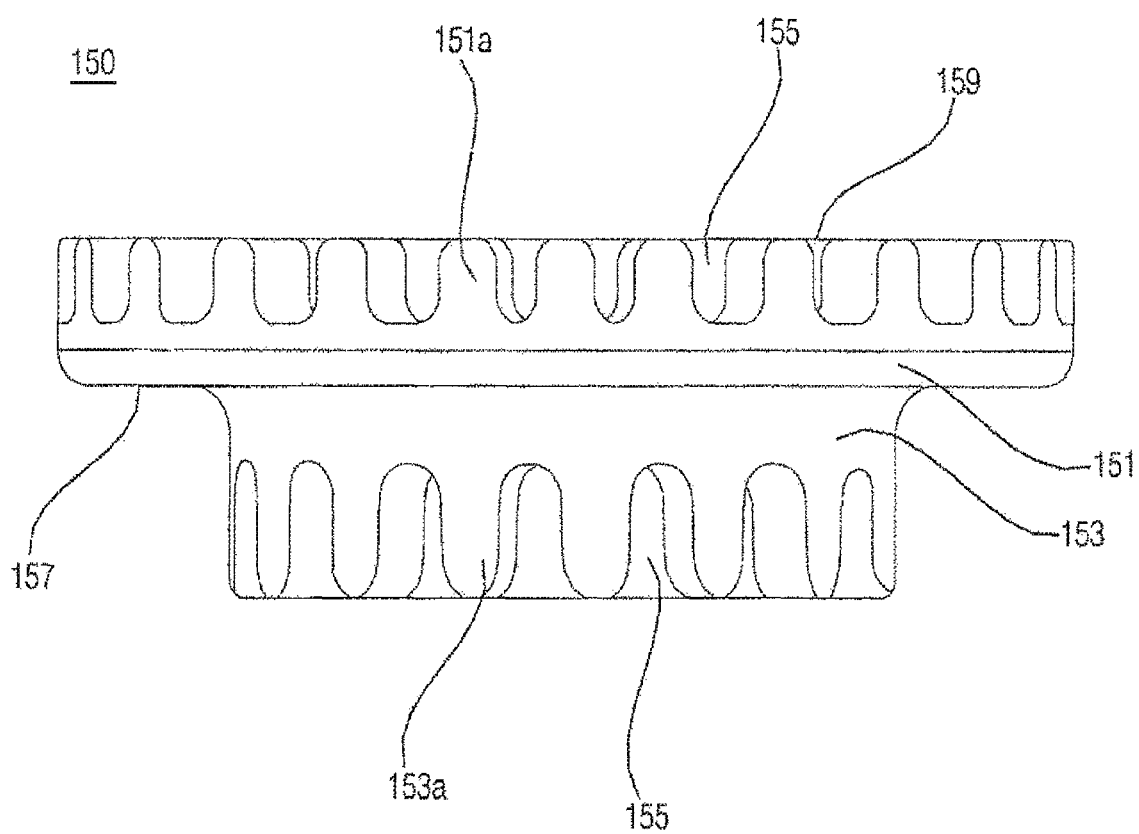
FIG. 3 is a side elevation view of the coupler 150 of FIG. 2.

Referring to FIGS. 1B and 1C, a laundry treatment apparatus according to each of embodiment B and embodiment C further includes a power transmission unit 140 configured to transmit rotational force of the washing shaft 132 to the pulsator 122 and the inner tub 120. Here, rotational force of the rotor 130*a* is transmitted to the inner tub 120 via the washing shaft 132 and the power transmission unit 140 in order.

In the spin-drying mode, the entirety of the power transmission unit 140 is rotated together with the washing shaft 132.

In the pulsator mode, the power transmission unit 140 may rotate the pulsator 122 at a rotational speed lower than the rotational speed of the washing shaft 132. In the pulsator mode, the speed reduction ratio of the rotational speed of the pulsator 122 to the rotational speed of the washing shaft 132 is maintained uniform without being affected by external load.

The power transmission unit 140 is configured to transmit some of the rotational force of the washing shaft 132 to the inner tub 120 in the free mode. The power transmission unit 140 transmits rotational reaction force of the pulsator 122 to the inner tub 120 such that the inner tub 120 is rotated in a direction opposite to the rotational direction of the pulsator 122 in the free mode. Specifically, in a non-load state in which there is no laundry, the rotational direction of the pulsator 122 and the rotational direction of the inner tub 120 become opposite each other by the power transmission unit 140 in the free mode. In the free mode, the rotational direction of the pulsator 122 and the rotational direction of the inner tub 120 may be changed by external load. In the free mode, the speed reduction ratio of the rotational speed of the pulsator 122 to the rotational speed of the washing shaft 132 may be changed by external load. In the free mode, the pulsator 122 is rotated and at the same time the inner tub 120 is rotated in the opposite direction by the reaction force thereof, and when laundry moves and collides with the pulsator 122 and the inner surface of the inner tub 120, the rotation of the pulsator 122 and the inner tub 120 is changed to somewhat reduce frictional force, whereby the effect of reducing damage to the laundry is achieved.

Hereinafter, a laundry treatment apparatus according to embodiment B will be described with reference to FIG. 1B.

In embodiment B, a power transmission unit 140*a* disposed between the inner tub 120 and the pulsator 122 is included. The power transmission unit 140*a* is disposed at the lower side of the pulsator 122. The power transmission unit 140*a* is disposed at the upper side of the base 121. In the free mode, rotational force of the power transmission unit 140*a* is transmitted to the inner tub 120 via an inner-tub fixing portion 136. The inner-tub fixing portion 136 connects and fixes a carrier 144 or a ring gear 145 to the inner tub 120. The lower end of the inner-tub fixing portion 136 is fixed to the base 121. The spin-drying shaft 131 and the washing shaft 132 are disposed so as to extend through the lower surface of the outer tub 110 in the upward-downward direction.

Hereinafter, a laundry treatment apparatus according to embodiment C will be described with reference to FIG. 1C.

In embodiment C, a power transmission unit 140*b* disposed outside the outer tub 110 is included. The power transmission unit 140*b* is disposed at the lower side of the outer tub 110. The power transmission unit 140*b* is disposed in the inner space 133*h* of the support member 133. The power transmission unit 140b is disposed between the first fixing part 133a and the second fixing part 133b. The power transmission unit 140b is disposed at the middle portion of the spin-drying shaft 131. The spin-drying shaft 131 includes a lower spin-drying shaft portion 131L disposed at the lower side and an upper spin-drying shaft portion 131H disposed at the upper side based on the power transmission unit 140b. The upper end of the lower spin-drying shaft portion 131L and the lower end of the upper spin-drying shaft portion 131H are fixed to the carrier 144 or the ring gear 145. In the free mode, rotational force of the power transmission unit 140b is transmitted to the inner tub 120 via the upper spin-drying shaft portion 131H. The spin-drying shaft 131 and the pulsator connection shaft 146 are disposed so as to extend through the lower surface of the outer tub 110 in the upward-downward direction.

Figure 5A:
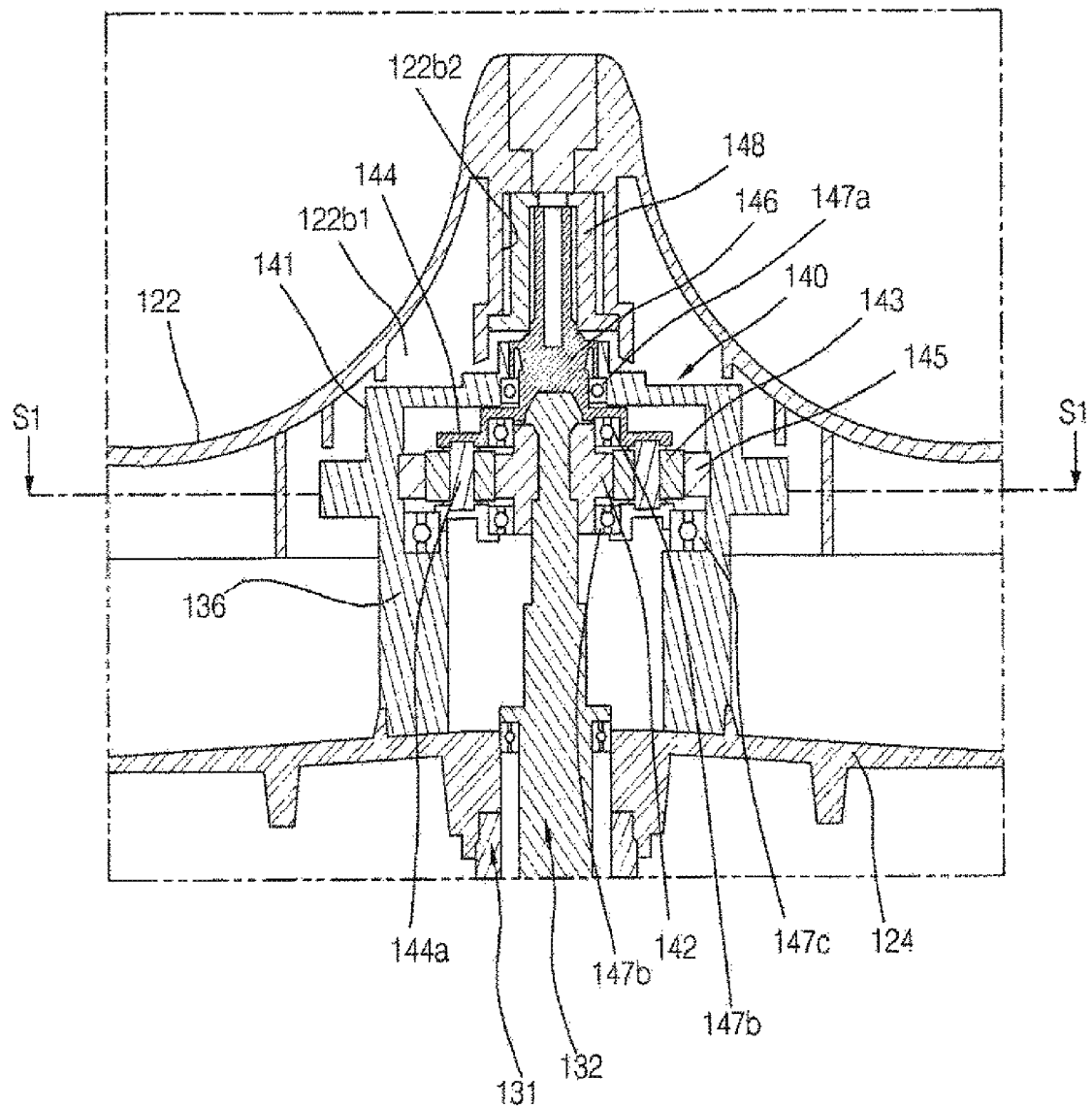
FIGS. 5A and 5B are partial sectional views showing embodiments of a power transmission unit 140 of FIG. 1.
Figure 5B:
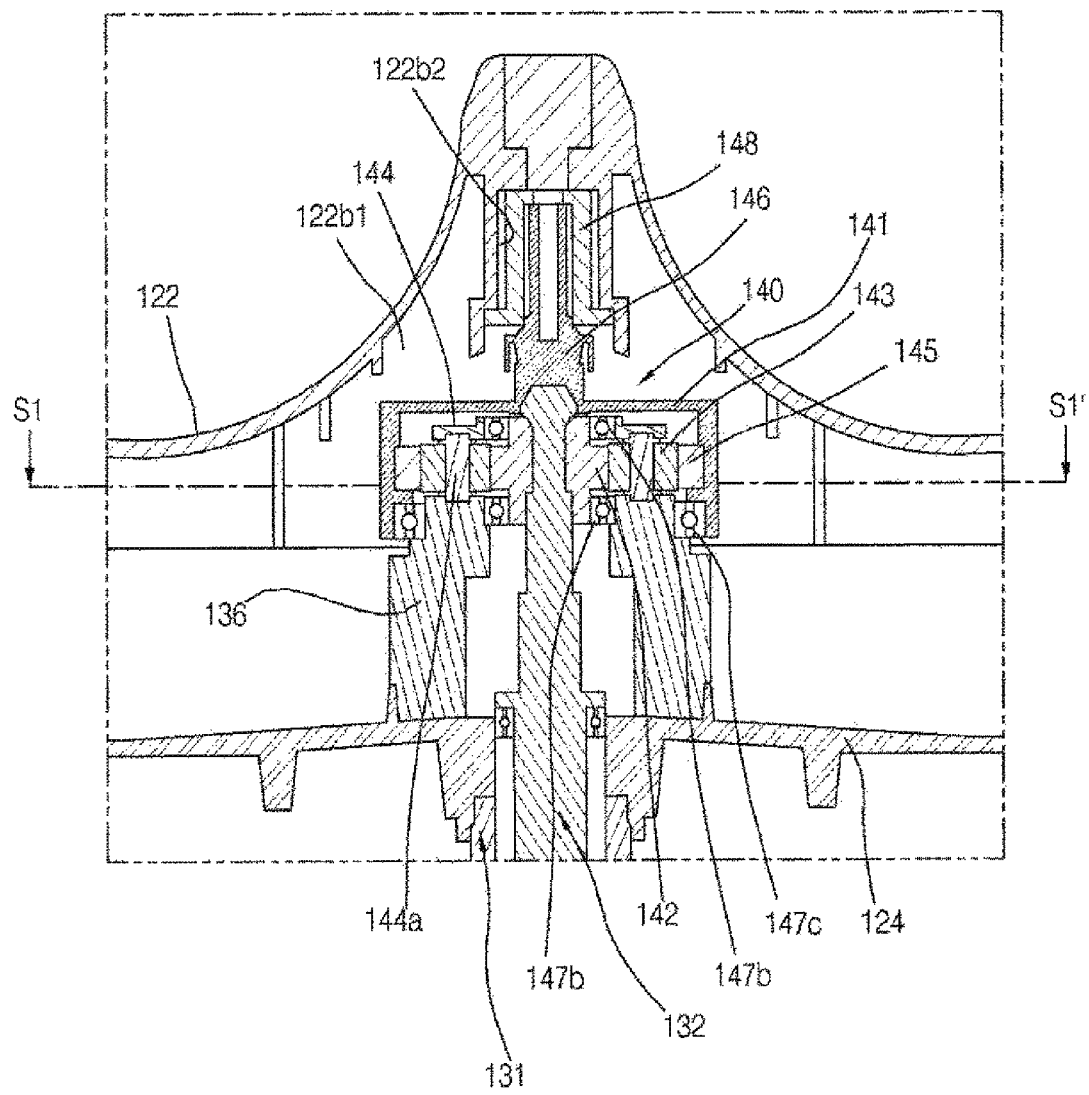

Hereinafter, embodiments of the power transmission unit 140 will be described in detail with reference to FIGS. 5A and 5C. FIGS. 5A and 5B show concrete construction of the power transmission unit 140 of embodiment B. Of course, however, respective components of the power transmission unit 140 of FIGS. 5A and 5B may be applied to embodiment C.

Referring to FIGS. 5A and 5C the power transmission unit 140 may include a gear module 142, 143, 144, and 145, to which the washing shaft 132 is connected. The power transmission unit 140 includes a sun gear 142, a plurality of planetary gears 143, a ring gear 145, and a carrier 144. The power transmission unit 140 includes a gear housing 141.

The gear housing 141 receives the sun gear 142, the plurality of planetary gears 143, the ring gear 145, and the carrier 144 therein. A ring-gear receiving recess configured to receive the ring gear 145 may be provided in the inner surface of the gear housing 141. The ring gear 145 is inserted into, coupled to, and fixed to the ring-gear receiving recess.

The sun gear 142 is connected to the washing shaft 132 in order to receive power from the driving motor 130. The sun gear 142 is fixed to the washing shaft 132. The sun gear 142 is rotated together with the washing shaft 132. The washing shaft 132 is coupled through the central portion of the sun gear 142. Rotational force of the washing shaft 132 is transmitted to the sun gear 142. A plurality of recesses may be formed in one of the outer circumferential surface of the washing shaft 132 and the inner circumferential surface of the sun gear 142, and a plurality of protrusions configured to be engaged with the recesses may be formed on the other. A plurality of gear teeth is formed on the outer circumferential surface of the sun gear 142.

Each planetary gear 143 is engaged with the outer circumferential surface of the sun gear 142, and is configured to be rotatable. Each planetary gear 143 is coupled to the sun gear 142 through gear teeth engagement therebetween. Each planetary gear 143 is rotated by rotational force received from the sun gear 142. Each planetary gear 143 is rotated on a planetary-gear connection shaft 144a coupled through the central portion of each planetary gear 143 in the vertical direction. Each planetary gear 143 may be rotated in a direction opposite the rotational direction of the sun gear 142. Rotational speed of each planetary gear 143 may be changed depending on rotational speed of the carrier 144 and rotational speed of the sun gear 142. The plurality of planetary gears 143 is disposed so as to be spaced apart from each other in the circumferential direction of the sun gear 142.

The ring gear 145 is engaged with each planetary gear 143 such that each planetary gear is inscribed in the inside of the ring gear. The ring gear 145 is formed in a ring shape. A plurality of gear teeth is formed along the inner circumferential surface of the ring gear 145. The plurality of planetary gears 143 is inscribed in the ring gear 145. The ring gear 145 is coupled to the plurality of planetary gears 143 through engagement therebetween while wrapping the plurality of planetary gears 143. The outside of the ring gear 145 is fixed to the gear housing 141.

The planetary-gear connection shaft 144a coupled through the central portion of each planetary gear 143 is fixed to the carrier 144. The carrier 144 is configured such that the plurality of planetary gears 143 is located between the upper surface and the lower surface thereof. The carrier 144 includes a planetary-gear connection shaft 144a, to which each planetary gear 143 is rotatably connected. The planetary-gear connection shaft 144a extends through the central portion of each planetary gear 143. The planetary-gear connection shafts 144a are provided in the same number as the planetary gears 143. The planetary-gear connection shafts 144a are provided between the upper surface and the lower surface of the carrier 144. The upper end of each planetary-gear connection shaft 144a is coupled to the upper surface of the carrier 144. The lower end of each planetary-gear connection shaft 144a is coupled to the lower surface of the carrier 144. The plurality of planetary-gear connection shafts 144a serves to support the plurality of planetary gears 143 so as to be rotated about the sun gear 142 in the state of being spaced apart from each other by a predetermined distance in the circumferential direction.

The power transmission unit 140 further includes a pulsator connection shaft 146 configured to transmit rotational force to the pulsator 122. The pulsator connection shaft 146 is fixed to the ring gear 145 or the carrier 144. One of the carrier 144 and the ring gear 145 is fixed to the spin-drying shaft 131, and the other is fixed to the pulsator connection shaft 146. That is, one of the carrier 144 and the ring gear 145 is rotated together with the spin-drying shaft 131, and the other is rotated together with the pulsator connection shaft 146. The lower end of the pulsator connection shaft 146 is connected to the power transmission unit 140, and the upper end thereof is fixed to the pulsator 122. The pulsator connection shaft 146 is configured to perform rotation different from rotation of the washing shaft 132 by the gear module 142, 143, 144, and 145.

The power transmission unit 140 may include a power transmission cap 148 disposed between the pulsator connection shaft 146 and the shaft support recess 122b2. The power transmission cap 148 is inserted and coupled between the pulsator connection shaft 146 and the shaft support recess 122b2. The power transmission cap 148 has therein a coupling portion into which the pulsator connection shaft 146 is forcibly fitted. A saw-toothed protrusion configured to transmit rotational force is formed on the outer circumferential surface of the power transmission cap 148.

The pulsator 122 receives rotational force via the pulsator connection shaft 146 of the carrier 144. The pulsator connection shaft 146 is disposed at the upper portion of the washing shaft 132 in the vertical direction. The pulsator connection shaft 146 and the washing shaft 132 are independently rotated. The pulsator 122 is decelerated according to the gear ratio of the gear module 142, 143, 144, and 145.

One of the carrier 144 and the ring gear 145 is rotated together with the pulsator 122, and the other is rotated together with the inner tub 120. That is, one of the carrier 144 and the ring gear 145 is fixed to the pulsator 122, and the other is fixed to the inner tub 120.

In at least the pulsator mode, the power transmission unit 140 transmits power such that rotational speed of the pulsator 122 is lower than the rotational speed of the driving motor 130. Rotation load of the driving motor 130 may be eliminated through the reduced rotational speed of the pulsator 122. Torque transmitted to the pulsator 122 is increased due to a decrease in rotational speed of the pulsator 122.

Hereinafter, a laundry treatment apparatus according to a first embodiment will be described with reference to FIG. 5A.

In the first embodiment, the ring gear 145 is rotated together with the inner tub 120, and the carrier 144 is rotated together with the pulsator 122. The ring gear 145 is fixed to the inner tub 120, and the carrier 144 is fixed to the pulsator 122.

In the first embodiment, the lower end of the pulsator connection shaft 146 is fixed to the carrier 144, and the upper end thereof is fixed to the pulsator 122. The lower end of the inner-tub fixing portion 136 is fixed to the inner tub 120, and the upper end thereof is fixed to the ring gear 145. The upper end of the inner-tub fixing portion 136 may be fixed to the ring gear 145 via the gear housing 141.

In the pulsator mode of the first embodiment, the inner tub 120 and the ring gear 145 remain stationary relative to the outer tub 110. In the pulsator mode, the ring gear 145 is fixed to the inner tub 120, whereby the planetary gears 143 are engaged with the ring gear 145 and revolve along the inner circumferential surface of the ring gear 145. In the pulsator mode, the planetary gears 143 revolve around the sun gear 142. The rate of rotation of the carrier 144 is equal to the rate of rotation of the plurality of planetary gears 143 due to revolution. The rate of rotation of the carrier 144 is determined according to the gear ratio between the ring gear 145 and the sun gear 142 and the rate of rotation of the sun gear 142. In the pulsator mode, the rotational direction of the washing shaft 132, the rotational direction of the sun gear 142, the revolution direction of the planetary gears 143, and the rotational direction of the pulsator 122 are the same.

In the free mode of the first embodiment, the carrier 144 fixed to the pulsator 122 and the ring gear 145 fixed to the inner tub 120 are rotated in opposite directions due to reaction force thereto.

Figure 6:
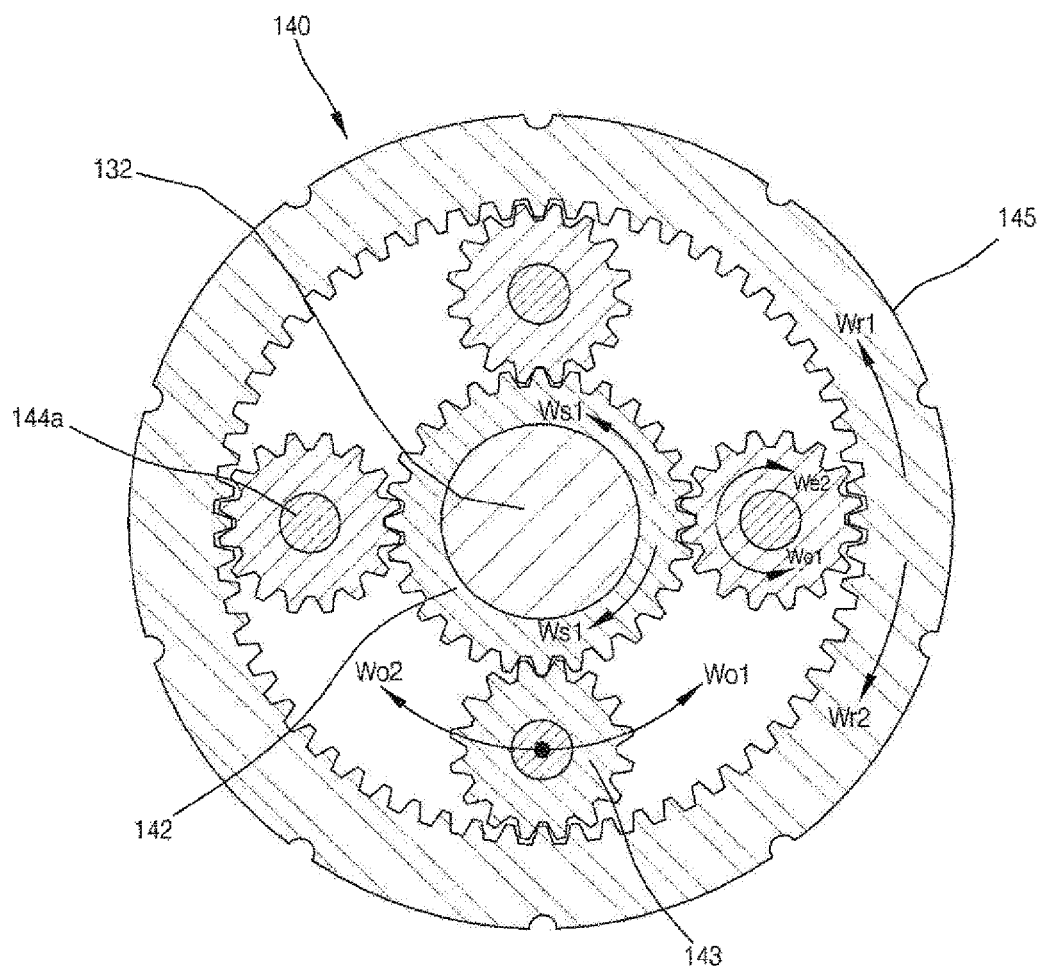
FIG. 6 is a cross-sectional conceptual view of a gear module 142, 143, 144, and 145 of the power transmission unit 140 taken along line S1-S1' of each of FIGS. 5A and 5B.
Figure 7:
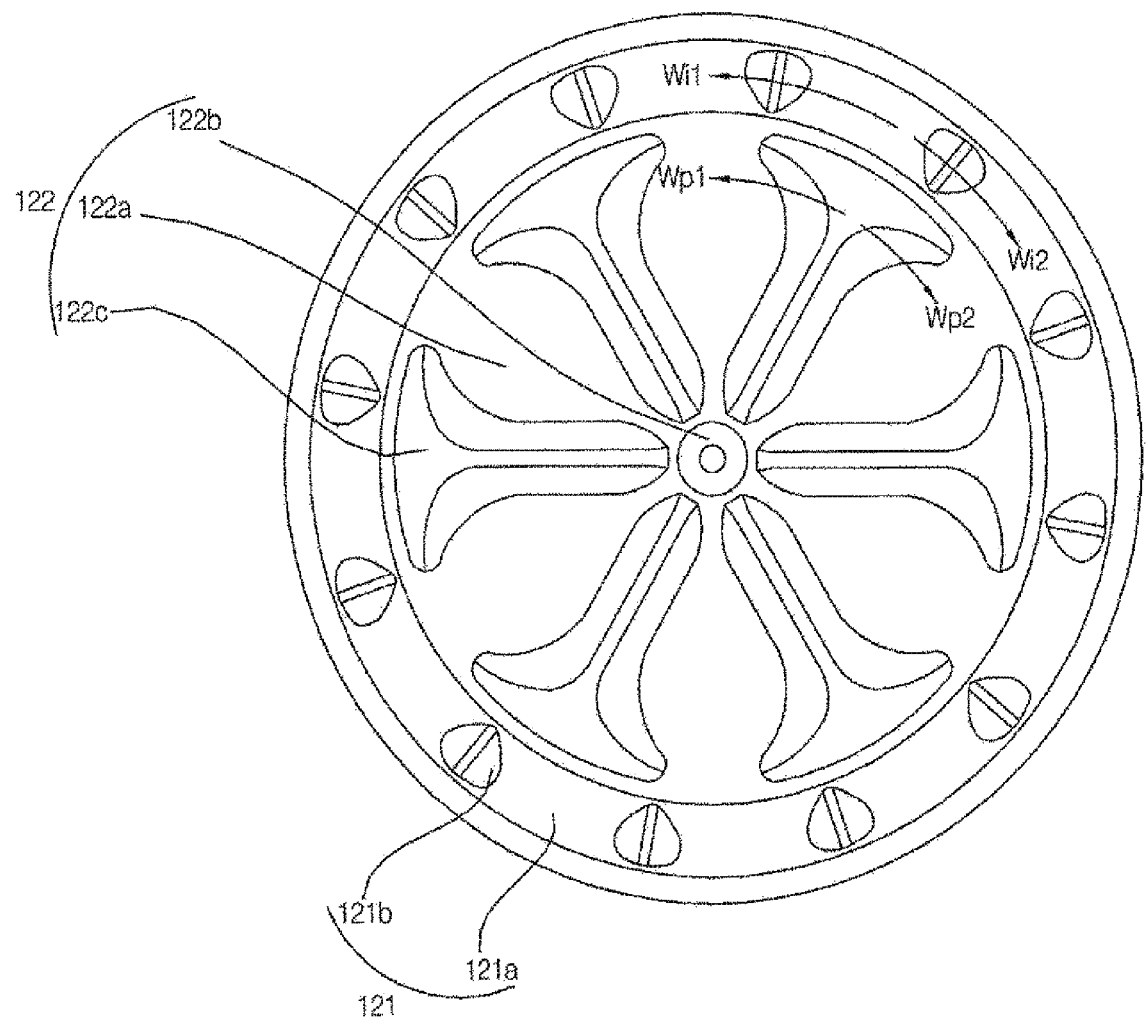
FIG. 7 is an elevation view of a pulsator 122 and a base 121 of a tub 120 when viewed from above.

Hereinafter, a relationship in rotational directions of respective components by mode in the first embodiment will be described with reference to FIGS. 6 and 7. The sun gear 142 may be rotated in a first direction Ws1 and a second direction Ws2 according to the rotational direction of the rotor 130a; however, the following description will be given on the assumption that the sun gear 142 is rotated in the first direction Ws1 for convenience of description.

In the spin-drying mode of the first embodiment, when the sun gear 142 is rotated in the first direction Ws1, the planetary gears 143 are not rotated, the carrier 144 is rotated in a first direction Wo1, and the ring gear 145 is rotated in a first direction Wr1. In the spin-drying mode of the first embodiment, when the sun gear 142 is rotated in the first direction Ws1, the pulsator 122 and the inner tub 120 are rotated together in first directions Wp1 and Wi1.

In the pulsator mode of the first embodiment, when the sun gear 142 is rotated in the first direction Ws1, the ring gear 145 remains stationary relative to the outer tub 110, the planetary gears 143 are rotated in a second direction We2, and the carrier 144 is rotated in the first direction Wo1. In the pulsator mode of the first embodiment, when the sun gear 142 is rotated in the first direction Ws1, the inner tub 120 remains stationary, and the pulsator 122 is rotated in the first direction Wp1.

In the free mode of the first embodiment, when the sun gear 142 is rotated in the first direction Ws1 in the state in which there is no load, such as laundry, the planetary gears 143 are rotated in the second direction We2, the carrier 144 is rotated in the first direction Wo1, and the ring gear 145 is rotated in a second direction Wr2 due to reaction force to rotation of the carrier 144. In the free mode of the second embodiment, when the sun gear 142 is rotated in the first direction Ws1 in the state in which there is no load, such as laundry, the pulsator 122 is rotated in the first direction Wp1, and the inner tub 120 is rotated in a second direction Wi2. In the free mode of the first embodiment, the rotational speeds of the pulsator 122 and the inner tub 120 may be changed due to load, such as laundry, whereby the rotational speeds of the carrier 144 and the ring gear 145 may be changed.

The power transmission unit 140 of the first embodiment includes a plurality of bearings 147a, 147b, and 147c configured to enable the washing shaft 132, the carrier 144, and the gear housing 141 to be rotated relative to each other. The first bearing 147a is installed between the upper portion of the gear housing 141 and the pulsator connection shaft 146 such that the pulsator connection shaft 146 can be rotated relative to the gear housing 141. The second bearing 147b is installed between the inner surface of the carrier 144 and the washing shaft 132 such that the washing shaft 132 can be independently rotated relative to the carrier 144. A plurality of second bearings 147b may be provided. The plurality of second bearings 147b is installed so as to be spaced apart from each other in the upward-downward direction. The third bearing 147c is installed between the inner surface of the gear housing 141 and the outer surface of the carrier 144 such that the carrier 144 can be rotated relative to the gear housing 141.

Hereinafter, a laundry treatment apparatus according to a second embodiment will be described with reference to FIG. 5B.

In the second embodiment, the carrier 144 is rotated together with the inner tub 120, and the ring gear 145 is rotated together with the pulsator 122. The carrier 144 is fixed to the inner tub 120, and the ring gear 145 is fixed to the pulsator 122.

In the second embodiment, the lower end of the pulsator connection shaft 146 is fixed to the ring gear 145, and the upper end thereof is fixed to the pulsator 122. The lower end of the pulsator connection shaft 146 may be fixed to the ring gear 145 via the gear housing 141. The lower end of the inner-tub fixing portion 136 is fixed to the inner tub 120, and the upper end thereof is fixed to the carrier 144.

In the pulsator mode of the second embodiment, the inner tub 120 and the ring gear 145 remain stationary relative to the outer tub 110. In the pulsator mode, the carrier 144 is fixed to the inner tub 120, whereby the planetary gears 143 are rotated together without revolution, and the ring gear 145 is rotated in the state of being engaged with the planetary gears 143. In the pulsator mode, the planetary gears 143 do not revolve around the sun gear 142. The rate of rotation of the ring gear 145 is determined according to the gear ratio between the ring gear 145 and the sun gear 142 and the rate of rotation of the sun gear 142. In the pulsator mode, the rotational direction of the washing shaft 132 and the rotational direction of the sun gear 142 are the same. In the pulsator mode, the rotational direction of the ring gear 145 and the rotational direction of the pulsator 122 are the same. In the pulsator mode, the rotational direction of the washing shaft 132 and the sun gear 142 is opposite the rotational direction of the ring gear 445 and the pulsator 122.

In the free mode of the second embodiment, the ring gear 145 fixed to the pulsator 122 and the carrier 144 fixed to the inner tub 120 are rotated in opposite directions due to reaction force thereto.

Hereinafter, a relationship in rotational directions of respective components by mode in the second embodiment will be described with reference to FIGS. 6 and 7.

In the spin-drying mode of the second embodiment, when the sun gear 142 is rotated in the first direction Ws1, the planetary gears 143 are not rotated, the carrier 144 is rotated in the first direction Wo1, and the ring gear 145 is rotated in the first direction Wr1. In the spin-drying mode of the second embodiment, when the sun gear 142 is rotated in the first direction Ws1, the pulsator 122 and the inner tub 120 are rotated together in the first directions Wp1 and Wi1.

In the pulsator mode of the second embodiment, when the sun gear 142 is rotated in the first direction Ws1, the carrier 144 remains stationary relative to the outer tub 110, the planetary gears 143 are rotated in the second direction We2, and the ring gear 145 is rotated in the second direction Wr2. In the pulsator mode of the second embodiment, when the sun gear 142 is rotated in the first direction Ws1, the inner tub 120 remains stationary, and the pulsator 122 is rotated in a second direction Wp2.

In the free mode of the second embodiment, when the sun gear 142 is rotated in the first direction Ws1 in the state in which there is no load, such as laundry, the planetary gears 143 are rotated in the second direction We2, the carrier 144 is rotated in the first direction Wo1, and the ring gear 145 is rotated in the second direction Wr2 due to reaction force to rotation of the carrier 144. In the free mode of the second embodiment, when the sun gear 142 is rotated in the first direction Ws1 in the state in which there is no load, such as laundry, the pulsator 122 is rotated in the second direction Wp2, and the inner tub 120 is rotated in the first direction Wi1. In the free mode of the second embodiment, the rotational speeds of the pulsator 122 and the inner tub 120 may be changed due to load, such as laundry, whereby the rotational speeds of the carrier 144 and the ring gear 145 may be changed.

The power transmission unit 140 of the second embodiment includes a plurality of bearings 147b and 147c configured to enable the washing shaft 132, the carrier 144, and the gear housing 141 to be rotated relative to each other. The second bearing 147b is installed between the inner surface of the carrier 144 and the washing shaft 132 such that the washing shaft 132 can be independently rotated relative to the carrier 144. A plurality of second bearings 147b may be provided. The plurality of second bearings 147b is installed so as to be spaced apart from each other in the upward-downward direction. The third bearing 147c is installed between the inner surface of the gear housing 141 and the outer surface of the carrier 144 such that the carrier 144 can be rotated relative to the gear housing 141.

Hereinafter, the clutch assembly 150, 160, 170, and 180 will be described in detail with reference to FIGS. 2 to 4C.

The clutch assembly 150, 160, 170, and 180 may set the pulsator mode in which the washing shaft 132 is rotated relative to the spin-drying shaft 131. The clutch assembly 150, 160, 170, and 180 may set the spin-drying mode in which the spin-drying shaft 131 is rotated together with the washing shaft 132. The clutch assembly 150, 160, 170, and 180 may set the free mode in which the washing shaft 132 can be rotated relative to the spin-drying shaft 131 depending on circumstances.

The clutch assembly 150, 160, 170, and 180 determines whether to rotate the spin-drying shaft 131 and the washing shaft 132 together. When the washing shaft 132 is rotated relative to the spin-drying shaft 131, the pulsator 122 is rotated relative to the inner tub 120. When the spin-drying shaft 131 and the washing shaft 132 are rotated together, the pulsator 122 and the inner tub 120 are rotated together.

The clutch assembly 150, 160, 170, and 180 determines whether to restrict the spin-drying shaft 131. Whether to restrict the inner tub 120 is determined depending on whether the spin-drying shaft 131 is restricted. The spin-drying shaft 131 is restricted to the outer tub 110 or the rotor 130a.

The clutch assembly 150, 160, 170, and 180 may set the pulsator mode or the spin-drying mode such that the spin-drying shaft 131 is restricted. In the pulsator mode, the spin-drying shaft 131 is restricted to the outer tub 110 and thus is stationary relative to the outer tub 110. In the spin-drying mode, the spin-drying shaft 131 is restricted to the rotor 130a and thus is rotated together with the rotor 130a.

The clutch assembly 150, 160, 170, and 180 may set the free mode such that the spin-drying shaft 131 is not restricted. In the free mode, the spin-drying shaft 131 is free, whereby rotation of the spin-drying shaft 131 is changed depending on reaction force due to rotation of the pulsator 122 and/or the state of laundry in the inner tub 120.

In the at least one restriction mode, the coupler 150 is restricted to the stopping member 170 or the rotary member 160.

Figure 4A:
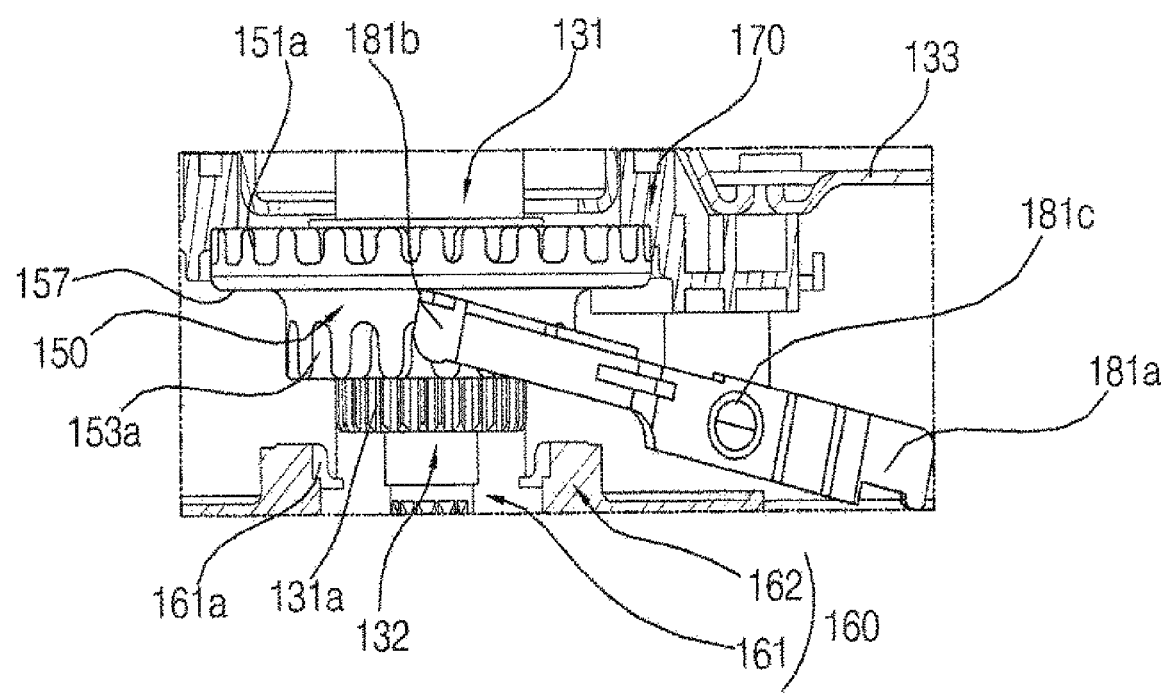
FIGS. 4A to 4C are side elevation views showing the operation of a coupler adjustment module 180 of FIG. 2 and a change in position of the coupler 150.

Referring to FIG. 4A, the coupler 150 is restricted to the stopping member 170 in the pulsator mode. The coupler 150 is configured to move to the upper limit position so as to be restricted to the stopping member 170. In the pulsator mode, the coupler 150 moves to the upper limit position. The upper limit position is the position at which the coupler 140 is caught by the stopping member 170 and thus does not move further upwards. In the pulsator mode, the coupler 150 is restricted to the stopping member 170 and is not restricted to the rotary member 160. In the pulsator mode, therefore, the spin-drying shaft 131 remains stationary. In the pulsator mode, the pulsator 122, which is one of the pulsator 122 and the inner tub 120, is rotated, and the inner tub 120 remains stationary.

Figure 4B:
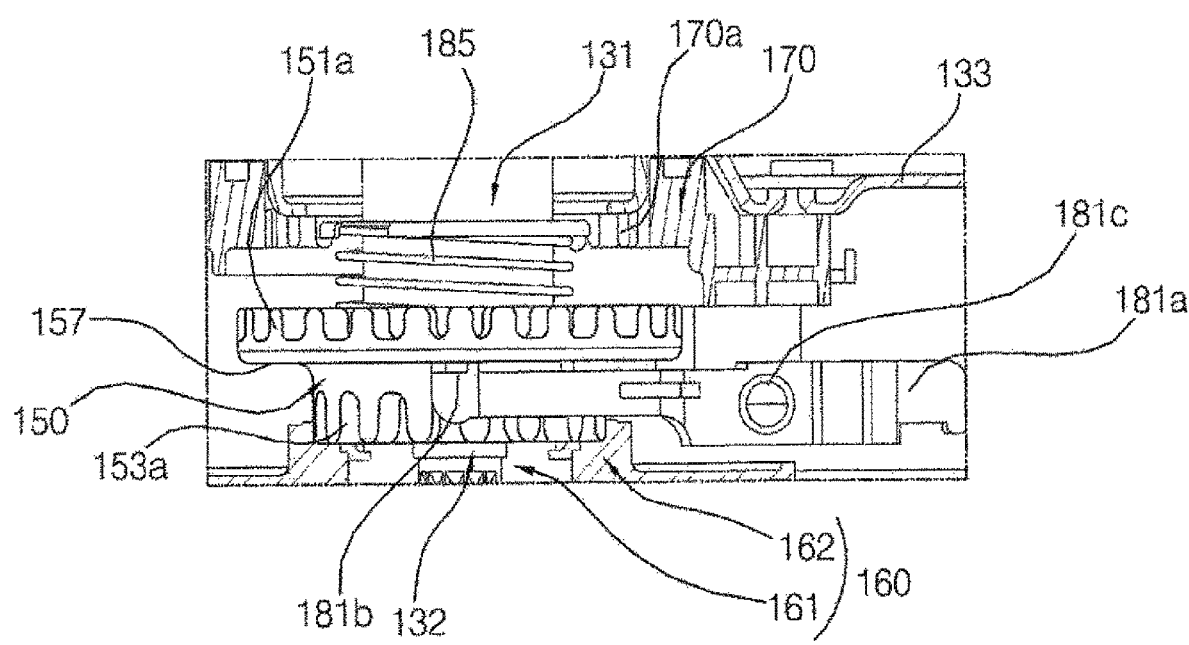

Referring to FIG. 4B, the coupler 150 is restricted to the rotary member 160 in the spin-drying mode. The coupler 150 is configured to move to the lower limit position so as to be restricted to the rotary member 160. In the spin-drying mode, the coupler 150 moves to the lower limit position. The lower limit position is the position at which the coupler 140 is caught by the rotary member 160 and thus does not move further downwards. In the spin-drying mode, the coupler 150 is restricted to the rotary member 160 and is not restricted to the stopping member 170. In the spin-drying mode, therefore, the spin-drying shaft 131 is rotated together with the washing shaft 132. In the pulsator mode, the pulsator 122 and the inner tub 120 are rotated together.

Figure 4C:
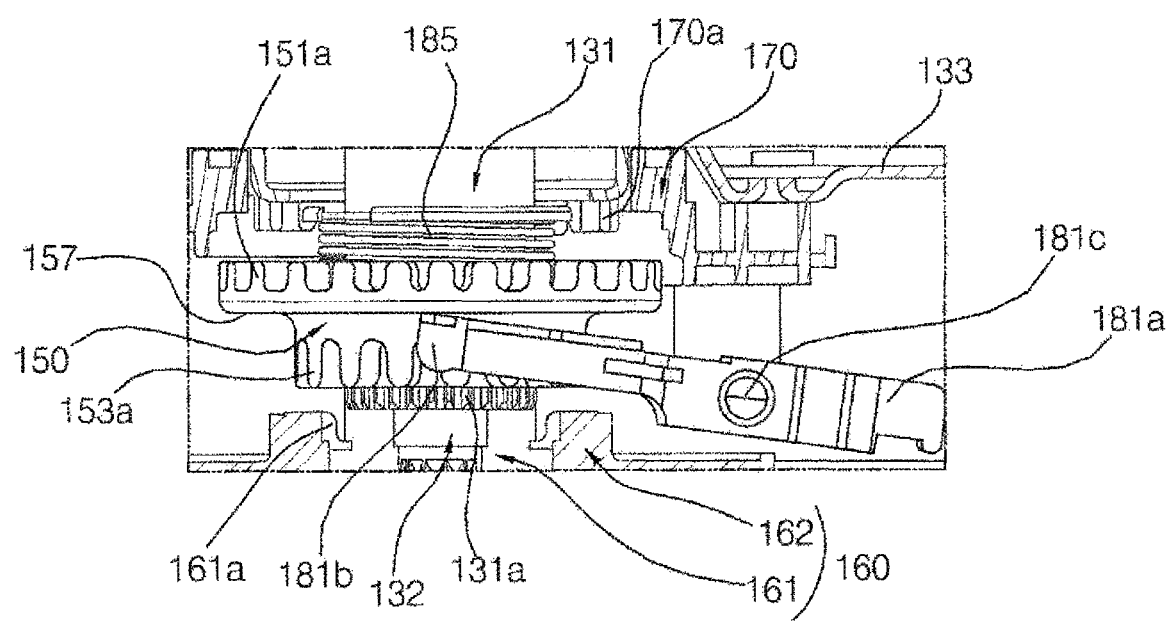

Referring to FIG. 4C, the coupler 150 is not restricted to the stopping member 170 and the rotary member 160 in the free mode. The coupler 150 is configured not to be restricted to the stopping member 170 and the rotary member 160 at a predetermined position between the upper limit position and the lower limit position in the free mode. In the free mode, the coupler 150 is free from the stopping member 170 and the rotary member 160. That is, the coupler 150 is spaced apart from the stopping member 170 and the rotary member 160 in the free mode. In the free mode, the spin-drying shaft 131 is in a free state. In the free mode, rotation of the spin-drying shaft 131 may be changed by external load even in the state in which rotation of the rotor 130a is uniform. In the free mode, rotation of the inner tub 120 may be changed even in the state in which rotation of the rotor 130a is uniform.

The coupler 150 includes an upper portion 151 and a lower portion 153. The upper portion 151 is generally formed in a cylindrical shape about the central axis. The lower portion 153 is generally formed in a cylindrical shape about the central axis. The upper portion 151 may be formed in a cylindrical shape having a diameter greater than the diameter of the lower portion 153.

The coupler 150 includes a first coupling portion 151a configured to be engaged with a stopping bushing portion 170a. The first coupling portion 151a may protrude upwards. The first coupling portion 151a has a plurality of protrusions protruding upwards. The plurality of protrusions of the first coupling portion 151a may be disposed so as to be spaced apart from each other by a predetermined distance in the circumferential direction. The first coupling portion 151a is disposed at the upper portion 151. The first coupling portion 151a may be formed at the portion of the upper portion 151 in the centrifugal direction.

The coupler 150 includes a second coupling portion 153a configured to be engaged with a rotor bushing portion 161a. The second coupling portion 153a may protrude downwards. The second coupling portion 153a has a plurality of protrusions protruding downwards. The plurality of protrusions of the second coupling portion 153a may be disposed so as to be spaced apart from each other by a predetermined distance in the circumferential direction. The second coupling portion 153a is disposed at the lower portion 153. The second coupling portion 153a may be formed at the portion of the lower portion 153 in the centrifugal direction.

The coupler 150 is rotated together with the spin-drying shaft 131, and is coupled thereto so as to be movable along the spin-drying shaft 131 in the upward-downward direction. The coupler 150 is provided at the portion thereof in a direction opposite the centrifugal direction with a spin-drying shaft coupling portion 155 configured to be coupled to the coupler coupling portion 131a of the spin-drying shaft 131. The coupler coupling portion 131a and the spin-drying shaft coupling portion 155 have a protrusion line and a recess configured to be engaged with each other. The protrusion line and the recess of the coupler coupling portion 131a and the spin-drying shaft coupling portion 155 extend upwards and downwards. The coupler coupling portion 131a and the spin-drying shaft coupling portion 155 are engaged with each other so as not to slide relative to each other in the circumferential direction, and are engaged with each other so as to slide relative to each other in the upward-downward direction.

The distance between the upper end of the first coupling portion 151a and the lower end of the second coupling portion 153a is less than the distance between the lower end of the stopping bushing portion 170a and the upper end of the rotor bushing portion 161a. Consequently, the second coupling portion 153a may or may not be engaged with the rotor bushing portion 161a in the state in which the first coupling portion 151a is spaced apart from the stopping bushing portion 170a. The first coupling portion 151a may or may not be engaged with the stopping bushing portion 170a in the state in which the second coupling portion 153a is spaced apart from the rotor bushing portion 161a.

The coupler 150 includes a pushing correspondence portion 157 configured to contact a pushing portion 181b of an adjustment member 181. When the coupler 150 is rotated, the pushing correspondence portion 157 is also rotated, whereby the pushing portion 181b may slide along the pushing correspondence portion 157. The pushing correspondence portion 157 may have a surface that faces downwards. The pushing correspondence portion 157 extends in the circumferential direction. The pushing correspondence portion 157 has a stepped surface formed between the upper portion 151 and the lower portion 153. The pushing correspondence portion 157 is disposed at the lower surface of the upper portion 151. The pushing correspondence portion 157 is located so as to be closer to the centrifugal side than the lower portion 153.

The coupler 150 includes an elastic member correspondence portion 159 configured to support one end of an elastic member 185. The elastic member correspondence portion 159 may be disposed at the upper side of the coupler 150. The elastic member correspondence portion 159 pushes the elastic member 185 when the coupler 150 moves upwards. The elastic member correspondence portion 159 receives restoring force of the elastic member 185. The elastic member correspondence portion 159 may have an upper surface extending in the circumferential direction. The elastic member correspondence portion 159 may be disposed along the circumference of the spin-drying shaft 131.

The stopping member 170 includes a stopping bushing portion 170a configured to be engaged with the first coupling portion 151a. The stopping bushing portion 170a has a plurality of recesses recessed upwards and spaced apart from each other in the circumferential direction. In the pulsator mode, the plurality of protrusions of the first coupling portion 151a is engaged with the plurality of recesses of the stopping bushing portion 170a.

A fixing-member coupling portion 170b is fastened to the support member 133. Consequently, the stopping member 170 is fixed to the outer tub 110.

The rotary member 160 may include a rotor bushing part 161 fastened to the rotor 130a and a washing-shaft coupling part 162 fastened to the washing shaft 132. The rotor bushing part 161 and the washing-shaft coupling part 162 are fastened to each other. The rotor bushing part 161 includes a part coupling portion 161c fastened to the washing-shaft coupling part 162.

The rotary member 160 includes a rotor bushing portion 161a configured to be engaged with the second coupling portion 153a. The rotor bushing portion 161a has a plurality of recesses recessed downwards and spaced apart from each other in the circumferential direction. In the spin-drying mode, the plurality of protrusions of the second coupling portion 153a is engaged with the plurality of recesses of the rotor bushing portion 161a.

The rotary member 160 includes a rotor coupling portion 161b fastened to the rotor 130a. Consequently, the rotary member 160 is rotated together with the rotor 130a.

The coupler adjustment module 180 includes an adjustment member 181 configured to be moved relative to the spin-drying shaft 131 in a pushing direction (here, the upward direction), which is one of the upward and downward directions, by the coupler 150. The coupler adjustment module 180 includes an adjustment member support portion 183 configured to support the adjustment member 181. The coupler adjustment module 180 includes an elastic member 185 configured to be moved relative to the spin-drying shaft 131 in a restoring direction (here, the downward direction), which is the other of the upward and downward directions, by the coupler 150.

The adjustment member 181 contacts the coupler 150 such that the coupler 150 is moved in the pushing direction. The adjustment member 181 may push the coupler 150 upwards. The adjustment member 181 may be configured to be rotatable about a horizontal rotary shaft.

The adjustment member 181 includes a clutch shaft portion 181c providing the horizontal rotary shaft. The clutch shaft portion 181c is supported by the adjustment member support portion 183. The clutch shaft portion 181c may protrude in the horizontal direction. The clutch shaft portion 181c may extend through an adjustment body 181a.

The adjustment member 181 includes an adjustment body 181a configured to be rotatable about the clutch shaft portion 181c. The adjustment body 181a may be formed in a bar shape.

The adjustment member 181 includes a pushing portion 181b configured to contact the coupler 150. When the adjustment body 181a is rotated about the clutch shaft portion 181c in the clockwise direction, the pushing portion 181b pushes the coupler 150 upwards, whereby the coupler 150 is moved upwards.

The adjustment member support portion 183 is fixed to the outer tub 110. The adjustment member support portion 183 may be fixed to the outer tub 110 via the stopping member 170. The adjustment member support portion 183 may be formed integrally with the stopping member 170.

The elastic member 185 may push the coupler 150 in the restoring direction due to restoring force. The upper end of the elastic member 185 is supported by an elastic member support portion 185a fixed to the outer tub 110. The lower end of the elastic member 185 is supported by the coupler 150. When the coupler 150 is moved upwards, the elastic member 185 is compressed. When the coupler 150 is moved downwards, the elastic member 185 is extended. Specifically, when the pushing portion 181b of the adjustment member 181 pushes the coupler 150 upwards, the coupler 150 is moved upwards, whereby the elastic member 185 is compressed. When the pushing portion 181b of the adjustment member 181 moves in the restoring direction, the elastic member 185 pushes the coupler 150 downwards due to restoring force, whereby the coupler 150 is moved downwards.

By movement of the adjustment member 181, the position of the coupler 150 may be changed from the lower side to the upper side. Specifically, the mode may be changed from the spin-drying mode to the free mode or the pulsator mode. The mode may be changed from the free mode to the pulsator mode.

By movement of the adjustment member 181 and restoring force of the elastic member 185, the position of the coupler 150 may be changed from the upper side to the lower side. Specifically, the mode may be changed from the pulsator mode to the free mode or the spin-drying mode. The mode may be changed from the free mode to the spin-drying mode.

The laundry treatment apparatus described above is not limitedly applied to the constructions and methods of the embodiments as previously described; rather, all or some of the embodiments may be selectively combined to achieve various modifications.

What is claimed is:

1. A laundry treatment apparatus comprising:
   an outer tub configured to receive wash water therein;
   a driving motor having a stator fixed to the outer tub and a rotor configured to be rotated relative to the stator;
   a washing shaft configured to be rotated together with the rotor;
   a spin-drying shaft disposed so as to be spaced apart from the rotor, the spin-drying shaft being configured to be rotatable;
   an inner tub disposed in the outer tub, the inner tub being configured to be rotated together with the spin-drying shaft;
   a pulsator provided in the inner tub at a lower portion thereof, the pulsator being configured to be rotated by rotation of the washing shaft; and
   a clutch assembly configured to select one of a plurality of modes,
     wherein the washing shaft extends in a direction from the rotor to the pulsator and has a first end fixed to the rotor and a second end fixed to the pulsator to rotate the pulsator integrally with the rotor, and
     wherein the plurality of modes comprise:
       i) a pulsator mode of restricting the spin-drying shaft to the outer tub and not restricting the spin-drying shaft to the rotor;
       ii) a spin-drying mode of restricting the spin-drying shaft to the rotor and not restricting the spin-drying shaft to the outer tub; and
       iii) a free mode of not restricting the spin-drying shaft to the rotor and the outer tub.

2. The laundry treatment apparatus according to claim 1, wherein, in the free mode, rotation of the spin-drying shaft is changeable by external load even in a state in which rotation of the rotor is uniform.

3. The laundry treatment apparatus according to claim 1, wherein
   the washing shaft is fixed to the rotor, and
   the inner tub is fixed to the spin-drying shaft.

4. The laundry treatment apparatus according to claim 1, wherein the clutch assembly comprises:
   a coupler coupled to the spin-drying shaft so as to be rotated together therewith, the coupler being configured to be movable along the spin-drying shaft in an upward-downward direction;
   a coupler adjustment module configured to move the coupler in the upward-downward direction;
   a stopping member fixed to the outer tub, the stopping member being disposed at an upper side of the coupler; and
   a rotary member fixed to the rotor, the rotary member being disposed at a lower side of the coupler, and
   the coupler is restricted to the stopping member or the rotary member in the at least one restriction mode and is not restricted to the stopping member or the rotary member in the free mode.

5. The laundry treatment apparatus according to claim 4, wherein the coupler is configured to move to an upper limit position so as to be restricted to the stopping member, is configured to move to a lower limit position so as to be restricted to the rotary member, and is configured not to be restricted to the stopping member and the rotary member at a predetermined position between the upper limit position and the lower limit position.

6. The laundry treatment apparatus according to claim 4, wherein
   the stopping member comprises a stopping bushing portion having a plurality of recesses recessed upwards and spaced apart from each other in a circumferential direction,
   the rotary member comprises a rotor bushing portion having a plurality of recesses recessed downwards and spaced apart from each other in the circumferential direction, and
   the coupler comprises:

a first coupling portion having a plurality of protrusions protruding upwards and engaged with the stopping bushing portion; and a second coupling portion having a plurality of protrusions protruding downwards and engaged with the rotor bushing portion.

7. The laundry treatment apparatus according to claim 6, wherein a distance between an upper end of the first coupling portion and a lower end of the second coupling portion is less than a distance between a lower end of the stopping bushing portion and an upper end of the rotor bushing portion.

\* \* \* \* \*